Gerald S. Baker
INVENTOR.

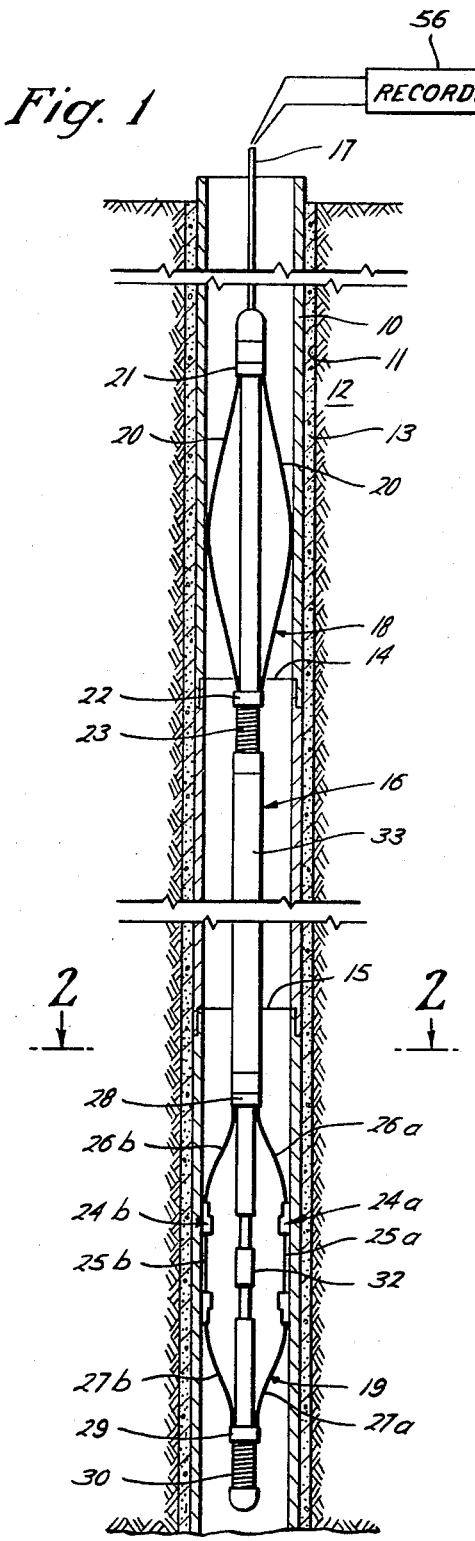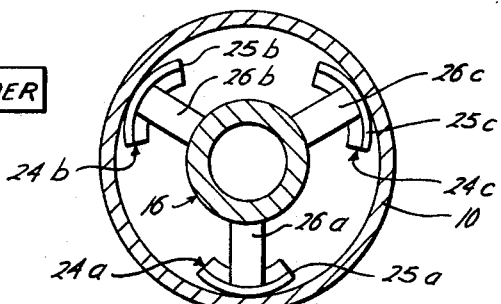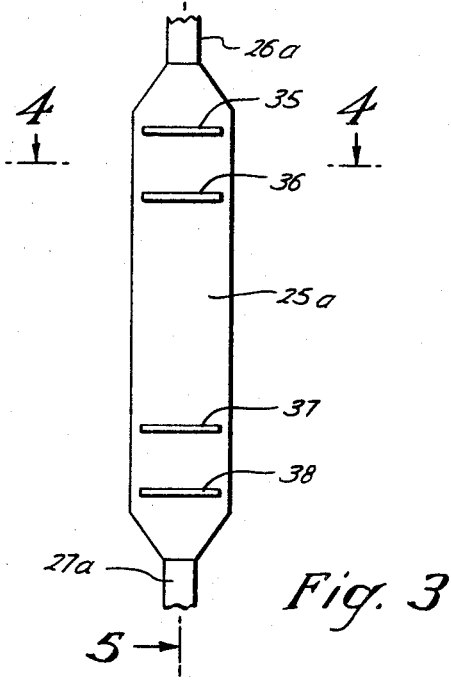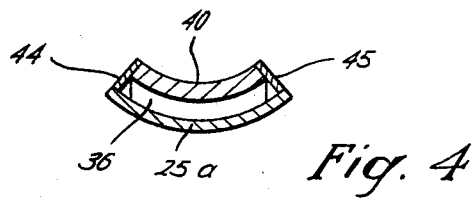
Gerald S. Baker
INVENTOR.
BY Richard E. Bee
ATTORNEY Aug. 16, 1966  G. S. BAKER  3,267,365
APPARATUS FOR DETECTING MAGNETIC ANOMALIES
Filed Sept. 12, 1963  3 Sheets-Sheet 2

BY Richard E. Bee
ATTORNEY

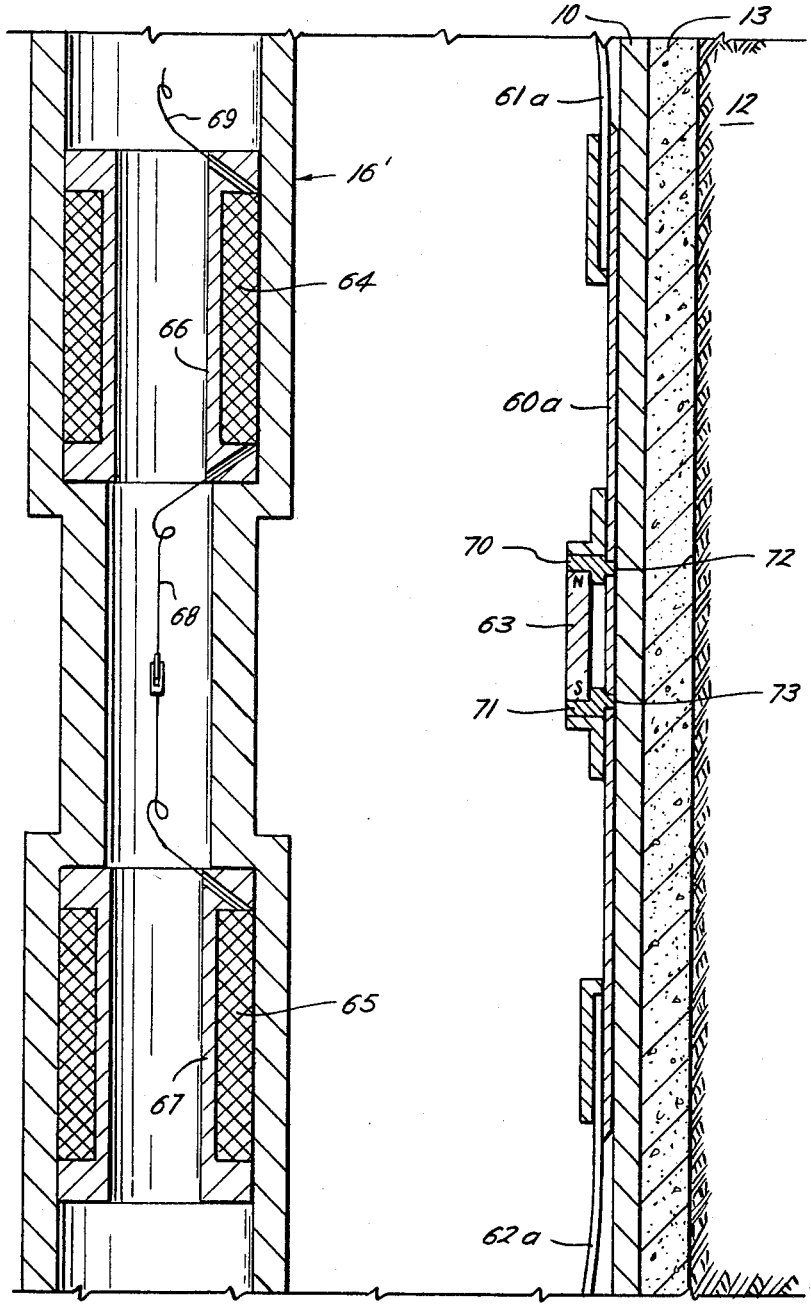

United States Patent Office 3,267,365
Patented August 16, 1966

3,267,365
APPARATUS FOR DETECTING
MAGNETIC ANOMALIES
Gerald S. Baker, Houston, Tex., assignor to Schlumberger Well Surveying Corporation, Houston, Tex., a corporation of Texas
Filed Sept. 12, 1963, Ser. No. 308,561
15 Claims. (Cl. 324—34)

This invention relates to apparatus for detecting magnetic anomalies in tubular structures, particularly, where the tubular structure is disposed below the surface of the earth. Such apparatus is particularly useful for detecting the joints between sections of casing pipe lining an oil well borehole.

Various types of devices for detecting joints and collars between sections of casing pipe lining a borehole have been heretofore proposed. Typical of these are the devices described in U.S. Patent No. 2,459,499, granted to Castel, and U.S. Patent No. 2,558,427, granted to Fagan. These devices include a detecting instrument which is adapted to be moved through the borehole by means of a cable suspended from the surface of the earth. The detecting instrument is constructed so that an electrical signal is generated each time that the instrument crosses a joint in the casing pipe. These signals are transmitted by way of insulated conductors contained in the cable to suitable indicating or recording apparatus located at the surface of the earth. Indications obtained in this manner are useful in controlling the depth at which other operations are carried out in the borehole. In particular, they are useful for positioning various tools and instruments at desired depths in the borehole and for correlating the depths at which measurements are obtained with different tools that are used in the borehole at different times.

Various problems have arisen with respect to the use of these casing joint locators. One problem is that the detecting instrument which is to be lowered into the borehole must sometimes be of a relatively small diameter in order to pass through an intermediate string of narrow diameter tubing which lies above the zone of interest. Reducing the diameter of the detecting instrument, however, tends to reduce the sensitivity or efficiency of such instrument. Also, it is frequently required that such instrument be combined with other borehole instruments where such other instruments must be operated in a centralized position in the borehole. This further reduces the sensitivity or efficiency of the joint detecting instrument, particularly, where the instrument is of a small diameter. As a consequence, the instrument may fail to provide a clear indication of one or more of the casing joints. This is particularly troublesome where the casing joints are of the so-called flush-joint type.

It is an object of the invention, therefore, to provide new and improved apparatus for detecting magnetic anomalies in a tubular structure which substantially avoids one or more of the foregoing limitations.

It is another object of the invention to provide new and improved magnetic anomaly detecting apparatus capable of detecting magnetic anomalies which are relatively small or slight in character.

It is a further object of the invention to provide new and improved magnetic anomaly detecting apparatus which will more accurately and reliably detect flush-type casing joints.

It is an additional object of the invention to provide new and improved magnetic anomaly detecting apparatus which will provide more accurate results when used with centralized types of borehole tools.

In accordance with the invention, apparatus for detecting magnetic anomalies in a tubular structure comprises an elongated support member adapted for movement through the tubular structure. Such apparatus also includes a wall-engaging member coupled to the support member and adapted to be urged against the inner wall of the tubular structure. The apparatus further includes magnet means forming part of the wall-engaging member for generating a magnetic flux field which passes through the tubular structure. The apparatus also includes magnetic field detection means forming part of the support member for detecting variations in the magnetic flux field.

For a better understanding of the present invention, together with other and further objects thereof, reference is had to the following description taken in connection with the accompanying drawings, the scope of the invention being pointed out in the appended claims.

Referring to the drawings:

FIG. 1 shows borehole apparatus including a representative embodiment of magnetic anomaly detecting apparatus constructed in accordance with the present invention;

FIG. 2 is an enlarged cross-sectional view taken along the section line 2—2 of FIG. 1;

FIG. 3 is an enlarged elevational view of a portion of the magnetic anomaly detecting apparatus of FIG. 1;

FIG. 4 is an enlarged cross-sectional view taken along the section lines 4—4 of FIG. 3;

FIG. 6 is an enlarged cross-sectional view similar to FIG. 5 but showing a modified embodiment of magnetic anomaly detecting apparatus.

Figure 5:
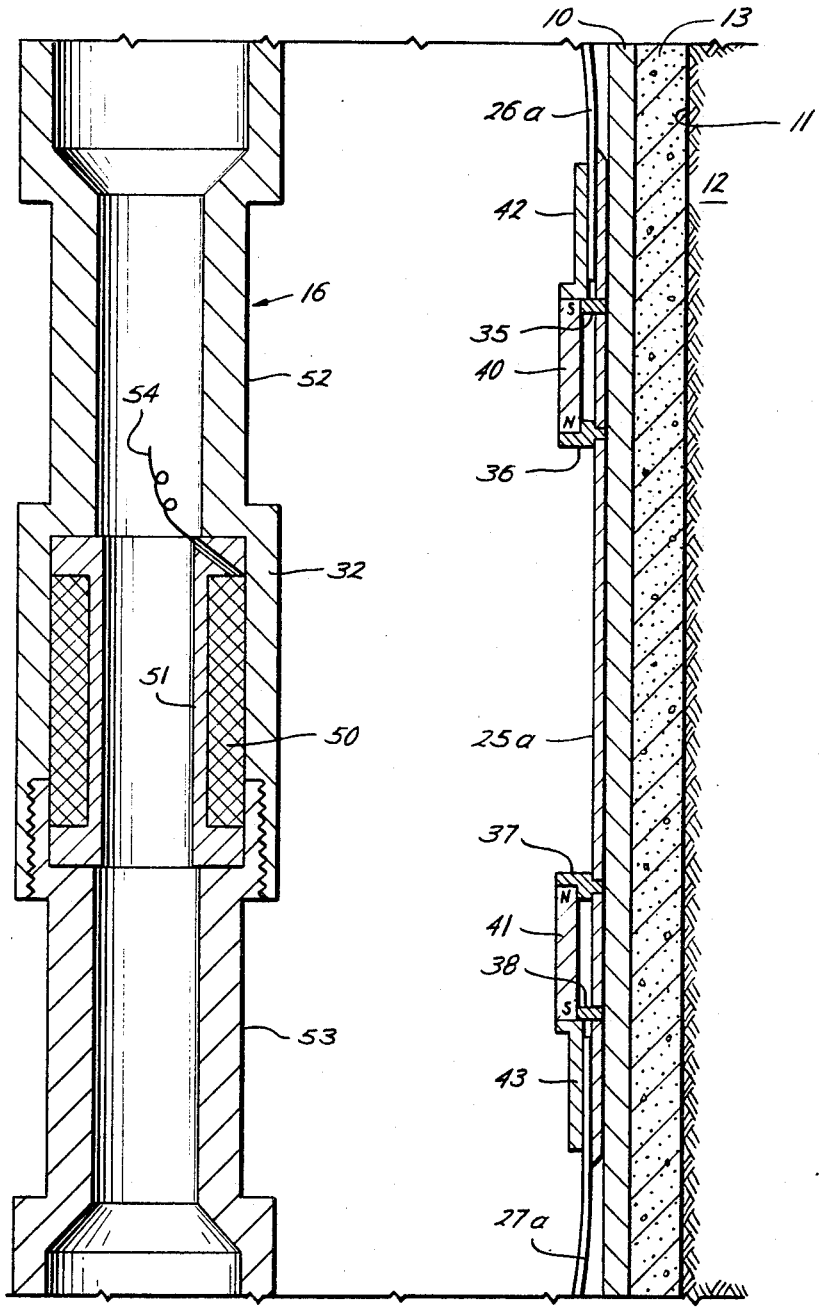
FIG. 5 is an enlarged cross-sectional view of a portion of the magnetic anomaly detecting apparatus of FIG. 1.

Referring to FIG. 1 of the drawings, there is shown apparatus for detecting magnetic anomalies in a tubular structure such as a casing pipe 10 lining a borehole 11 drilled into subsurface earth formations 12. The casing pipe 10 is usually made of iron or steel. The annular space between the outside of the casing pipe 10 and the earth formations 12 is filled with a layer of cement 13. Casing pipe 10 is made in sections and typical joints between sections are indicated at 14 and 15. These casing joints 14 and 15 are of the flush-joint type.

The apparatus shown in FIG. 1 includes an elongated support member 16 adapted for longitudinal movement through the interior of the casing pipe 10. Support member 16 is suspended from the surface of the earth by means of an armored multiconductor cable 17. Coupled to the support member 16 are an upper centralizer assembly 18 and a lower centralizer assembly 19. These centralizer assemblies keep the support member 16 in a central position in the casing pipe 10. The upper centralizer assembly 18 includes a plurality of resilient, spring-like arm members 20 which are connected between a fixed upper collar members 21 and a slidable lower collar member 22. A coil-type spring 23 is provided for urging the slidable collar 22 in an upwardly direction.

The lower centralizer assembly 19 includes three wall-engaging members 24a, 24b, and 24c, the latter being seen in the cross-sectional view of FIG. 2, which are adapted to be urged against the inner wall of the casing pipe 10 at three angularly spaced locations around the inner circumference thereof. As seen in FIG. 2, these locations are evenly spaced at 120° intervals. The wall-engaging members 24a, 24b, and 24c include wall-engaging pads 25a, 25b, and 25c, respectively, which are attached to arm means which include upper arm members 26a, 26b, and 26c, respectively, and lower arm members 27a, 27b, and 27c, respectively. These arm members 26a–26c are made of a resilient metal such as spring steel, though in some cases it may be preferable to use a non-magnetic metal such as K-Monel, a nickel alloy.

In either case, the arm members are resilient in character and are constructed to provide a spring action which urges the pads 25a–25c away from the support member 16. The pads 25a–25c are made of a non-magnetic metal such as K-Monel and are provided with sufficient shape and thickness so as to be relatively rigid. The upper arm members 26a, 26b, and 26c are coupled to the support member 16 by means of a fixed upper collar member 28 and a slidable lower collar member 29. A coil-type spring 30 is mounted on the lower end of the support member 16 for urging the slidable collar member 29 in an upwardly direction.

A portion 32 of the support member 16, which comprises that part of the support member 16 lying between the collar members 28 and 29, is constructed of a non-magnetic metal such as K-Monel.

Included within or mounted on a middle section 33 of the support member 16 is appropriate apparatus for performing additional measurements in the casing pipe 10. Thus, for example, the middle section 33 may include sonic measuring apparatus for determining the character of the bond between the cement 13 and the casing 10. Instead, the middle section 33 may include suitable flowmeter apparatus or fluid density measuring apparatus for measuring the flow rate or density of fluid in the casing pipe 10 for the case of a producing oil well.

Considering in greater detail the construction of the metal pad 25a, reference is had to FIGS. 3–5 of the drawings. FIG. 3 shows an elevational view of the wall-engaging face of the metal pad 25a. FIG. 4 is an enlarged cross-sectional view taken along the line 4—4 of FIG. 3 and the portion of FIG. 5 relating to the metal pad 25a is an enlarged cross-sectional view taken along the section line 5—5 of FIG. 3. As seen in these views, particularly that of FIG. 5, the metal pad 25a includes magnet means forming part of the pad 25a for generating a magnetic flux field which passes through the casing pipe 10. This magnet means includes pole piece means represented by a plurality of separate pole pieces 35, 36, 37, and 38, each of which extends laterally through the main body of the pad 25a. These pole pieces 35–38 are composed of a magnetic material such as soft iron. The magnet means also includes a pair of permanent magnets 40 and 41 which are spaced apart along the longitudinal dimension of the pad 25a on the back side thereof. The upper permanent magnet 40 is secured to the upper two pole pieces 35 and 36, while the lower permanent magnet 41 is secured to the lower two pole pieces 37 and 38. These magnets 40 and 41 are of equal magnetic strength and are arranged in a magnetically opposing manner by having like poles facing one another.

Additional members 42 and 43 are secured to the back side of the metal pad 25a and serve to retain both the arm members 26a and 27a and the magnets 40 and 41 in place. As seen in FIG. 4, side plates 44 and 45 extend along side the upper magnet 40 and are attached to the metal pad 25a to also help in retaining the magnet 40 in place. Similar side plates also run along the side the lower magnet 41. As seen in FIG. 4, both the metal pad 25a and the magnets 40 and 41 (the latter not being visible in FIG. 4) are provided with a curved or semi-cylindrical contour when viewed from above. In addition to the main body of the metal pad 25a, each of the supporting or retaining members 42, 43, 44, and 45 is also constructed of a non-magnetic metal such as K-Monel. The metal pad 25a, together with the various support members thereon, are constructed so that the pad 25a as a whole provides a relatively rigid structure.

Each of the other two metal pads 25b and 25c is constructed in the same manner as is the metal pad 25a. In particular, each includes a pair of longitudinally spaced apart permanent magnets.

As seen in the cross-sectional view of FIG. 5, the support member 16 is provided with magnetic field detection means for detecting variations in the magnetic flux fields produced by the various magnets. This detection means includes a detection coil 50 which is located within the non-magnetic portion 32 of the support member 16. This detection coil 50 includes many turns of insulated conductor wire which are wound around a cylindrical spool or bobbin 51 which is coaxial with the longitudinal axis of the support member 16. The spool or bobbin 51 is made of a magnetic material such as soft iron and, hence, constitutes a magnetic core piece for the coil 50. Reduced diameter portions 52 and 53 are provided in the support member 16 immediately above and below the coil 50 for purposes of receiving the magnets 40 and 41 and associated support members when the metal pad 25a is in a collapsed position up against the body of the support member 16. Similar considerations apply to the other two pad members 25b and 25c.

Electrical connection to the detection coil 50 is made by way of a pair of insulated conductors or lead wires 54 which extend upwardly through the interior of the support member 16 and are connected to a pair of insulated conductors in the cable 17. In some cases, the electrical signal generated across the coil 50 may pass through an amplifier circuit or other electrical circuit contained within the support member 16 before it reaches the conductors of the cable 17. In any event, the signal generated by the coil 50 or a replica thereof is supplied by the conductors of cable 17 to a recorder 56 located at the surface of the earth, as seen in FIG. 1. The recorder 56 records the signals on an appropriate recording medium which is advanced in synchronism with the movement of the support member 16 through the casing pipe 10. The recorder 56 may also provide a visible indication of the signals.

Considering now the operation of the apparatus thus far described, the support member 16 is moved through the casing pipe 10 by means of the cable 17 and, at the same time, the three metal pads 25a, 25b, and 25c are urged against the inner wall of the casing pipe 10 at three angularly spaced locations around the circumference thereof. Whenever the metal pads 25a, 25b, and 25c pass over a magnetic anomaly in the casing pipe 10, the magnetic fields produced by the permanent magnets located on these metal pads are disturbed and these disturbances are detected by the detection coil 50 located within the support member 16. As a consequence, characteristic electrical signals are generated across the coil 50 which serve to mark the occurrence of such anomalies. These electrical signals are recorded by the recorder 56 at the surface of the earth. They may also be visually observed and counted for purposes of positioning the support member 16 at a desired vertical depth in the casing pipe 10.

Considering in detail the magnetic flux fields generated by the permanent magnets 40 and 41 located on the metal pad 25a, it will initially be assumed that no anomalies or discontinuities are present in the vicinity of metal pad 25a. In this case, the upper magnet 40 sets up a magnetic field with lines of flux flowing out of the north pole and returning to the south pole of such magnet. A majority of this magnetic flux follows the low reluctance path provided by pole piece 36, the casing pipe 10, and pole piece 35. Some of this flux, however, also circles back through the space behind the metal pad 25a and links with the detection coil 50. Similarly, for the lower magnet 41, most of the magnetic flux follows the low reluctance path provided by pole piece 37, casing pipe 10 and pole piece 38. Also, some of this flux circles back through the space behind the pad 25a and links with the detection coil 50. In the absence of a magnetic anomaly, the system is balanced and no net signal appears across the output terminals of the detection coil 50.

Assume now that a magnetic anomaly, such as a notch in the inner wall of the casing such as would be provided by a casing joint, is located in the inner wall of the casing pipe 10 and further assume that the support member 16 and pad 25a are moving in a downwardly direction toward this anomaly or notch. As this notch passes between the pole pieces 37 and 38, the magnetic reluctance through the casing pipe 10 is increased for the flux from the lower magnet 41. This causes a momentary increase in the flux linking with the detection coil 50. This, in turn, generates a momentary voltage pulsation across the output terminals of the coil 50. Typically, this voltage pulsation resembles a single cycle of a sine wave. As the notch or discontinuity moves between the pole piece 37 and the pole piece 36, the apparatus returns to a more or less balanced condition, from a magnetic standpoint, and no signal appears across the coil 50. When the notch or discontinuity passes between the pole piece 36 and the pole piece 35, the magnetic reluctance for the flux from the upper magnet 40 which is attempting to flow through the casing pipe 10 is increased and, as a consequence, less flux flows through the casing pipe 10 and more flows through the region behind the pad member 25a. This causes a momentary increase in the amount of magnetic flux linking with the detection coil 50. This generates another voltage pulsation across the output terminals of the coil 50. Typically, this voltage pulsation will also resemble a single cycle of a sine wave. It will, however, be of opposite phase or polarity with respect to the pulsation produced by the lower magnet 41 because the magnetic flux will be cutting the coil 50 in an opposite direction.

These voltage pulsations generated across the output terminals of the detection coil 50 are transmitted to the recorder 56 located at the surface of the earth. Thus, there appears on the recording medium of the recorder 56 a closely spaced pair of voltage pulsations each time the metal pad 25a passes completely across a magnetic anomaly in the casing pipe. In this manner, indications are recorded on the recorder 56 corresponding to the occasions when the pad 25a crosses the joints in the casing pipe 10.

In some cases, it may be preferred to obtain more of a singular pulsation for each casing joint, instead of a closely spaced pair of pulsations. This can be done by placing the magnets 40 and 41 closer to one another along the longitudinal dimension of the pad 25a. This will cause the individual pulsations to overlap somewhat so as to provide only a single composite pulsation for each anomaly or casing joint.

Each of the other metal pads 25b and 25c operates in a similar manner to also produce voltage pulsations across the detection coil 50. Since the three metal pads 25a–25c are at substantially the same longitudinal level in the casing pipe 10, these pulsations from the separate pads are in step with one another and, hence, serve to augment one another so as to produce a voltage signal across the terminals of the detection coil 50 which has a magnitude which is substantially greater than would have been obtained with a single pad alone. This assures that the magnetic anomaly is symmetrical and extends completely around the circumference of the casing pape 10. A casing joint is, of course, just such an anomaly. Thus, the present apparatus gives preferential treatment to magnetic anomalies which exhibit circumferential symmetry. The apparatus will also detect other types of magnetic anomalies which do not extend completely around the casing pipe but, in these cases, the resulting signal amplitude will be somewhat reduced.

Referring now to FIG. 6 of the drawings, there is shown a partial cross-sectional view similar to FIG. 5 except that FIG. 6 shows a modified form of construction for the magnetic anomaly detecting portion of the apparatus. As such, there is shown a modified support member 16' and a modified wall-engaging metal pad 60a. Pad 60a is coupled to the support member 16' by means of spring-type arm members 61a and 62a in the same manner as was the metal pad 25a of FIG. 5. As for the FIG. 5 embodiment, the FIG. 6 embodiment includes three such metal pads disposed at three angularly spaced apart locations in the same manner as indicated in FIG. 2. For purposes of explanation, it is sufficient to consider only the one metal pad 60a in detail.

In the FIG. 6 embodiment, only a single permanent magnet 63 is located on the metal pad 60a. On the other hand, a pair of detection coils 64 and 65 are located within the elongated support member 16'. The portion of the support member 16' shown in FIG. 6 is made of a non-magnetic metal such as K-Monel. The coils 64 and 65 are individually wound on separate cores of magnetic material 66 and 67 which are in the shape of cylindrical spools which are coaxial with the longitudinal axis of the support member 16'. Coils 64 and 65 are electrically interconnected in a series-opposing manner by means of insulated conductors or lead wires 68 and electrical connection with the recorder is made by way of lead wires 69.

The permanent magnet 63 is centrally located intermediate the longitudinal extremities of the coils 64 and 65 and is secured to a pair of pole pieces 70 and 71 having portions 72 and 73 which extend through the main body of the metal pad 60a. These pole pieces 70 and 71 are constructed of a magnetic material such as soft iron. Except for the magnet 63 and the pole pieces 70 and 71, the remainder of the parts making up the metal pad 60a are composed of a non-magnetic metal such as K-Monel.

In operation and assuming that no magnetic anomalies are present in the vicinity of magnet 63, a major portion of the magnetic flux generated by the magnet 63 passes from the north pole end of the magnet 63, through the pole piece 70, the casing pipe 10, and the pole piece 71, back to the south pole of such magnet 63. A lesser portion of the magnetic flux passes through the region behind the metal pad 60a and links with each of coils 64 and 65. Since coils 64 and 65 are connected series-opposing, the system is essentially in a balanced condition from an electromagnetic standpoint. As a consequence, symmetrical changes in the magnetic flux field, such as would occur if the metal pad 60a moved closer to the support member 16', will produce no net signal across the final output terminals for the series-connected pair of coils 64 and 65.

Significant signals will be generated only when the metal pad 60a passes across a magnetic anomaly in the casing pipe 10. The action in this case is that as the magnetic anomaly approaches, say, the lower pole piece 71, the symmetrical nature of the magnetic fields is disturbed and the flux linking with the coil 65 is changed. This change is greater than any change in the flux linking with the coil 64. As a consequence, a net voltage pulsation is generated across the series-connected pair of coils 64 and 65. A similar event occurs as the magnetic anomaly moves past the upper pole piece 70, except that in this case the disturbance is greater for the upper coil 64 than it is for lower coil 65. Since these disturbances occur fairly close together, timewise, the corresponding voltage pulsations will, so to speak, overlap one another to produce a single composite voltage pulsation for any given magnetic anomaly.

The various forms of magnetic anomaly detecting apparatus described in the foregoing embodiments have been found to be particularly efficient in detecting magnetic anomalies of relatively small size and, in particular, for detecting casing joints of the so-called flush-joint type. A further advantage of the invention is that it is not necessary to run any connecting wires or lead wires from the various wall-engaging pad members to the central support member. This greatly simplifies the construction of the apparatus.

While there have been described what are at present considered to be preferred embodiments of this invention, it will be obvious to those skilled in the art that various changes and modifications may be made therein without

What is claimed is:

1. Apparatus for detecting magnetic anomalies in a tubular structure comprising:
   an elongated support member adapted for movement through the tubular structure;
   a wall-engaging member coupled to the support member and supported thereby and adapted to be urged against the inner wall of the tubular structure;
   magnet means forming part of the wall-engaging member for generating a magnetic flux field which passes through the tubular structure;
   and magnetic field detection means forming part of the support member for detecting variations in the magnetic flux field.

2. Apparatus for detecting magnetic anomalies in casing pipe lining a borehole in the earth comprising:
   an elongated support member adapted for movement through the casing pipe;
   a wall-engaging member coupled to the support member and supported thereby and adapted to be urged away from the support member and against the inner wall of the casing pipe;
   magnet means forming part of the wall-engaging member for generating a magnetic flux field which passes through the casing pipe;
   and magnetic field detection means forming part of the support member for detecting variations in the magnetic flux field.

3. Apparatus for detecting magnetic anomalies in a tubular structure comprising:
   an elongated support member adapted for movement through the tubular structure;
   a wall-engaging member coupled to the support member and supported thereby and adapted to be urged against the inner wall of the tubular structure;
   a permanent magnet forming part of the wall-engaging member for generating a magnetic flux field which passes through the tubular structure;
   and magnetic field detection means forming part of the support member for detecting variations in the magnetic flux field.

4. Apparatus for detecting magnetic anomalies in a tubular structure comprising:
   an elongated support member adapted for movement through the tubular structure;
   a wall-engaging member coupled to the support member and supported thereby and adapted to be urged against the inner wall of the tubular structure;
   magnet means forming part of the wall-engaging member for generating a magnetic flux field which passes through the tubular structure;
   and coil means forming part of the support member for detecting variations in the magnetic flux field.

5. Apparatus for detecting magnetic anomalies in a tubular structure comprising:
   an elongated support member adapted for movement through the tubular structure;
   a wall-engaging member coupled to the support member and supported thereby and adapted to be urged against the inner wall of the tubular structure;
   a permanent magnet located on the wall-engaging member for generating a magnetic flux field which passes through the tubular structure;
   and coil means located within the support member for detecting variations in the magnetic flux field.

6. Apparatus for detecting magnetic anomalies in a tubular structure comprising:
   an elongated support member adapted for movement through the tubular structure, at least a portion of the support member being constructed of non-magnetic material;
   a wall-engaging member coupled to the support member adjacent the non-magnetic portion thereof and supported thereby and adapted to be urged against the inner wall of the tubular structure;
   magnet means forming part of the wall-engaging member for generating a magnetic flux field which passes through the tubular structure;
   and coil means located within the non-magnetic portion of the support member for detecting variations in the magnetic flux field.

7. Apparatus for detecting magnetic anomalies in a tubular structure comprising:
   an elongated support member adapted for movement through the tubular structure;
   a wall-engaging pad of non-magnetic material;
   arm means coupling the pad to the support member and adapted to urge the pad against the inner wall of the tubular structure;
   magnetic pole piece means forming part of the pad and extending laterally therethrough;
   a permanent magnet secured to the pole piece means for generating a magnetic flux field which passes through the tubular structure;
   and magnetic field detection means forming part of the support member for detecting variations in the magnetic flux field.

8. Apparatus for detecting magnetic anomalies in a tubular structure comprising:
   an elongated support member adapted for movement through the tubular structure, at least a portion of the support member being constructed of non-magnetic material;
   a wall-engaging pad of non-magnetic material;
   arm means coupling the pad to the support member adjacent the non-magnetic portion thereof and adapted to urge the pad against the inner wall of the tubular structure;
   magnetic pole piece means forming part of the pad and extending laterally therethrough;
   a permanent magnet secured to the pole piece means for generating a magnetic flux field which passes through the tubular structure;
   and coil means located within the non-magnetic portion of the support member for detecting variations in the magnetic flux field.

9. Apparatus for detecting magnetic anomalies in a tubular structure comprising:
   an elongated support member adapted for longitudinal movement through the tubular structure;
   a wall-engaging member coupled to the support member and supported thereby and adapted to be urged against the inner wall of the tubular structure;
   a pair of permanent magnets forming part of the wall-engaging member and longitudinally spaced apart thereon for generating opposing magnetic flux fields which pass through the tubular structure;
   and a detection coil located on the support member for detecting variations in the magnetic flux fields.

10. Apparatus for detecting magnetic anomalies in a tubular structure comprising:
    an elongated support member adapted for longitudinal movement through the tubular structure;
    a wall-engaging member coupled to the support member and supported thereby and adapted to be urged against the inner wall of the tubular structure;
    a permanent magnet forming part of the wall-engaging member for generating a magnetic flux field which passes through the tubular structure;
    and a pair of longitudinally spaced apart detection coils located on the support member for detecting variations in the magnetic flux field.

11. Apparatus for detecting magnetic anomalies in a tubular structure comprising:
    an elongated support member adapted for longitudinal movement through the tubular structure;

a wall-engaging member coupled to the support member and supported thereby and adapted to be urged against the inner wall of the tubular structure;

a permanent magnet forming part of the wall-engaging member for generating a magnetic flux field which passes through the tubular structure;

and a pair of longitudinally spaced apart detection coils located on the support member for detecting variations in the magnetic flux field, these coils being electrically interconnected in a series-opposing manner.

12. Apparatus for detecting magnetic anomalies in a tubular structure comprising:

an elongated support member adapted for movement through the tubular structure;

a plurality of wall-engaging members coupled to the support member and supported thereby and adapted to be urged against the inner wall of the tubular structure;

a plurality of magnet means individually forming part of different ones of the wall-engaging members for generating magnetic flux fields which pass through the tubular structure;

and magnetic field detection means forming part of the support member for detecting variations in the magnetic flux fields.

13. Apparatus for detecting magnetic anomalies in a tubular structure comprising:

an elongated support member adapted for movement through the tubular structure;

three wall-engaging members coupled to the support member and supported thereby and adapted to be urged against the inner wall of the tubular structure at three angularly spaced apart locations around the inner circumference of the tubular structure;

at least three permanent magnets individually forming part of different ones of the wall-engaging members for generating magnetic flux fields which pass through the tubular structure;

and at least one detection coil forming part of the support member for detecting variations in the magnetic flux fields.

14. Apparatus for detecting magnetic anomalies in a tubular structure comprising:

an elongated support member adapted for movement through the tubular structure;

centralizer means coupled to the support member and including a plurality of wall-engaging members for keeping the support member in a central position in the tubular structure;

a plurality of magnet means individually forming part of different ones of the wall-engaging members for generating magnetic flux fields which pass through the tubular structure;

and magnetic field detection means forming part of the support member for detecting variations in the magnetic flux fields.

15. Apparatus for detecting magnetic anomalies in casing pipe lining a borehole in the earth comprising:

an elongated support member adapted for movement through the casing pipe;

centralizer means coupled to the support member and including a plurality of wall-engaging members for keeping the support member in a central position in the casing pipe;

a plurality of permanent magnets individually located on different ones of the wall-engaging members for generating magnetic flux fields which pass through the casing pipe;

and coil means located within the support member for detecting variations in the magnetic flux fields.

References Cited by the Examiner

UNITED STATES PATENTS

| | | | |
|---|---|---|---|
| 2,194,229 | 3/1940 | Johnston et al. | 324—37 |
| 2,459,499 | 1/1949 | Castel | 324—34.1 |
| 2,558,427 | 6/1951 | Fagan | 324—34 |
| 2,892,151 | 6/1959 | Bender | 324—34 |
| 2,987,668 | 6/1961 | Gondouin | 324—34 |

RICHARD B. WILKINSON, *Primary Examiner.*